United States Patent [19]

Murphy

[11] 3,830,203
[45] Aug. 20, 1974

[54] SUCKLING ANIMAL FEEDER
[75] Inventor: George W. Murphy, Minneapolis, Minn.
[73] Assignee: K & K Manufacturing, Inc., Rogers, Minn.
[22] Filed: Apr. 2, 1973
[21] Appl. No.: 346,727

[52] U.S. Cl............... 119/51.11, 119/51.13, 119/71
[51] Int. Cl............................................. A01k 5/00
[58] Field of Search ..... 119/51.11, 71, 51.12, 51.13

[56] References Cited
UNITED STATES PATENTS
3,208,431   9/1965   Kloss............................... 119/51.11
3,648,660   3/1972   Esquival........................... 119/51.11

Primary Examiner—Hugh R. Chamblee
Assistant Examiner—J. N. Eskovitz
Attorney, Agent, or Firm—Merchant, Gould, Smith & Edell

[57] ABSTRACT

A mixing chamber positioned to receive dry granular food from a reservoir, and liquid to produce a liquid food, the chamber having an outlet provided with a suckling nipple and a discharge valve. An electric control circuit for mechanism for feeding liquid and dry food to the mixing chamber, and for mechanism operating the discharge valve, includes a cycle timing mechanism for controlling the cycle of dry food and liquid delivery to the mixing chamber, and mixing of the dry food and liquid; and a time delay mechanism for varying the time interval between the delivery of material to the mixing chamber and rendering the mixed liquid food available at the nipple. A dry food agitator in the reservoir is driven by a connection to a rotary dry food transfer member.

2 Claims, 11 Drawing Figures

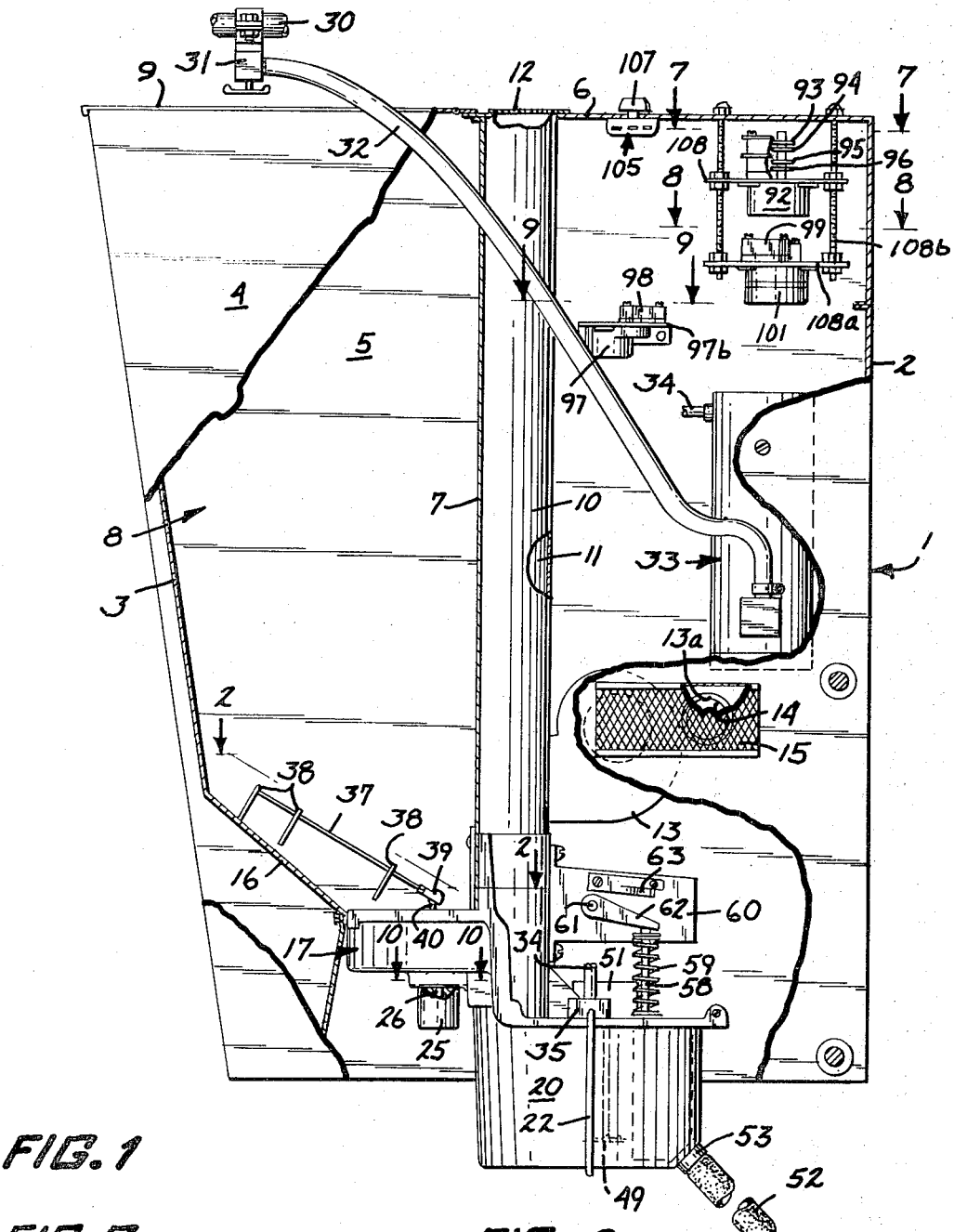

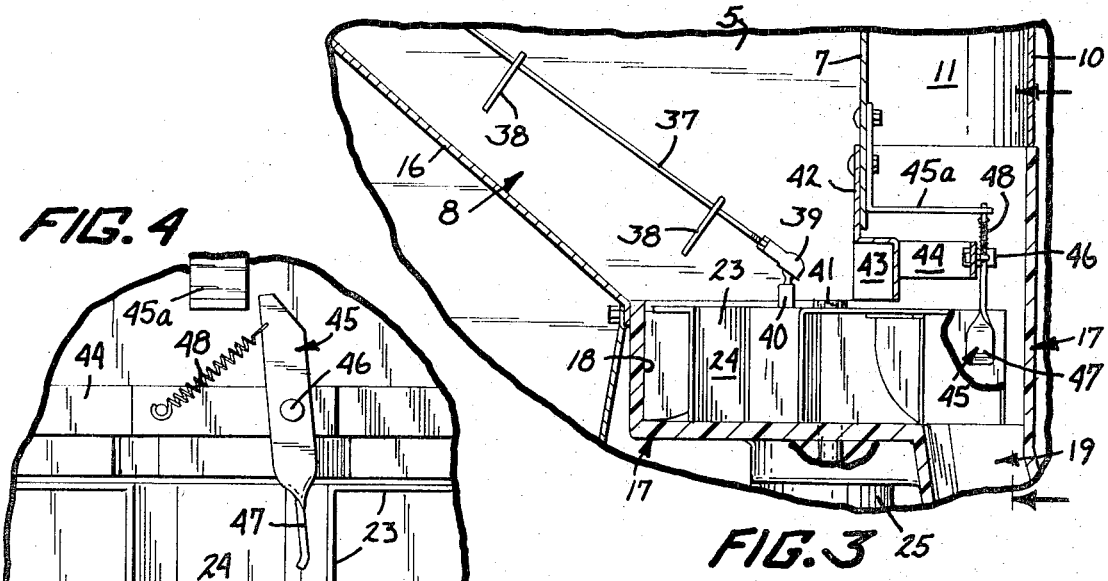
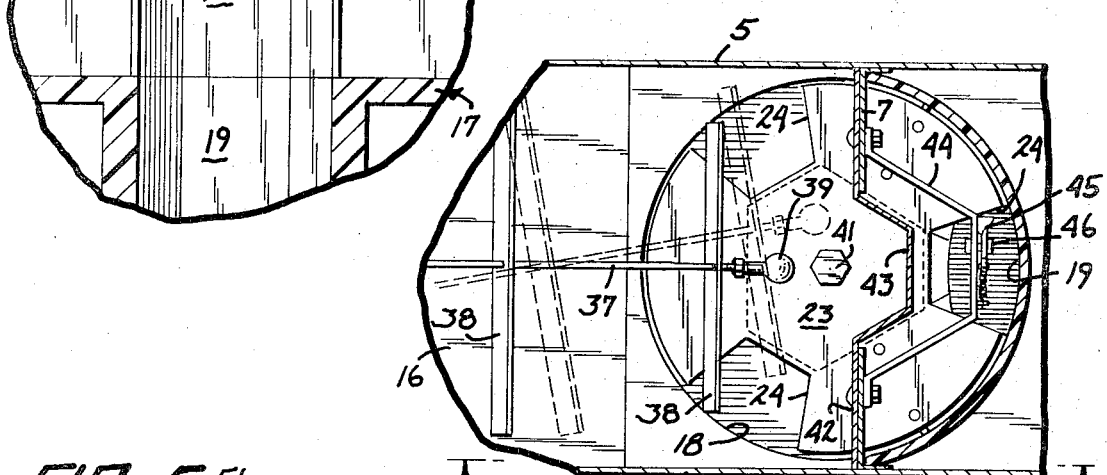
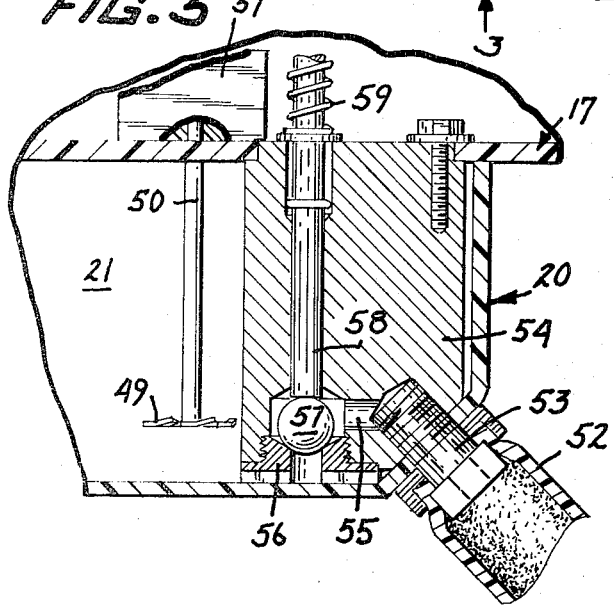
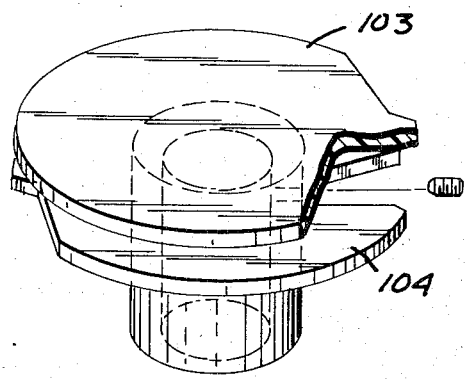

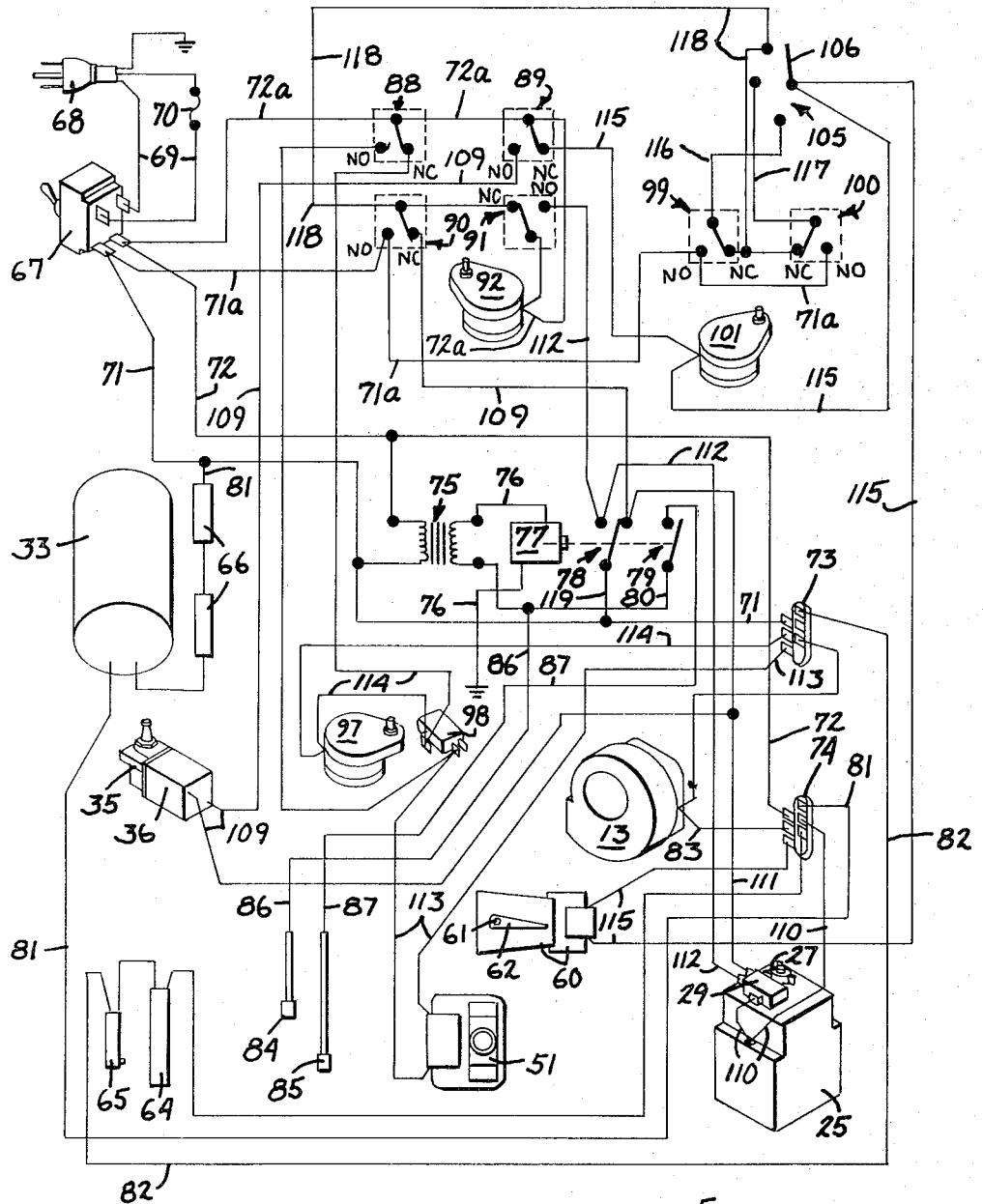
FIG. 11
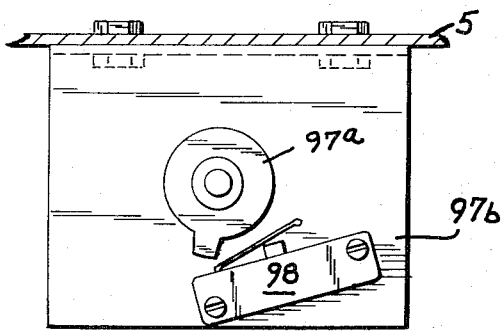
FIG. 9
FIG. 10

3,830,203

SUCKLING ANIMAL FEEDER

BACKGROUND OF THE INVENTION

This invention is in the nature of an improvement on devices of the general type disclosed in U. S. Pat. No. 3,037,481 and 3,208,431, both assigned to the assignee of this application. While the devices of these patents have operated very satisfactorily, I have found it advantageous to vary the time interval between feedings from a given feeder, inasmuch as feeding habits of animals do change as the animal grows. Further, I have found that, should an animal leave the feeder before consuming an entire batch of mixed food, the next succeeding food supply and mixing cycle should not be initiated until the preceding supply is consumed, and that a predetermined minimum of time should elapse before a subsequent supply of food is available at the nipple.

SUMMARY OF THE INVENTION

An important object of this invention is the provision of means whereby the duration of time intervals between feeding and subsequent availability of food at the nipple may be quickly and easily changed.

Another object of this invention is the provision of an agitator for the supply of dry granular food in the feeder to prevent caking and bridging of the granular food.

To these and other ends, hereinafter to become apparent, the present food mixer and animal feeder involves structure defining a reservoir for dry granular food and a mixing chamber. A water heater and a liquid valve are provided for supplying heated water to the mixing chamber. A rotary power driven disk-like transfer member, having spaced transfer chambers, is rotated intermittently to deliver charges or predetermined quantities of dry food from the reservoir to the mixing chamber, and a power driven agitator in the mixing chamber effects thorough mixing of the dry food particles with the water in the mixing chamber. A discharge valve in the bottom portion of the mixing chamber controls discharge of mixed liquid food to a feeding nipple projecting outwardly from the mixing chamber. A dry food agitator is connected to the rotary transfer member and is reciprocated responsive to rotation of the transfer member. Delivery of liquid and dry food to the mixing chamber is controlled by cyclic timer motor operated cams and cam operated switches, and operation of the discharge valve is controlled by a time delay arrangement including other switches operated by motor driven cams. A selector switch is manually set in a selected one of several positions to provide for a desired time delay between the completion of food mixing and operation of the discharge valve to permit food to be drawn from the nipple.

DESCRIPTION OF THE DRAWINGS

FIG. 1 is a view in side elevation of the animal food mixer and feeder of this invention, some parts being broken away and some parts being shown in section;

FIG. 2 is an enlarged fragmentary detail, partly in plan and partly in horizontal section, taken substantially on the line 2—2 of FIG. 1;

FIG. 3 is a fragmentary vertical section taken on line 3—3 of FIG. 2, some parts being broken away;

FIG. 4 is an enlarged fragmentary section taken on the line 4—4 of FIG. 3;

FIG. 5 is an enlarged fragmentary vertical section through a portion of the mixing bowl, outlet valve and feeding nipple of this invention;

FIG. 6 is a view in perspective of one of the timing cams of this invention, some parts being broken away and some parts being shown in section;

FIGS. 7, 8, 9 and 10 are enlarged fragmentary horizontal sections taken on the lines 7—7, 8—8, 9—9 and 10—10 respectively, of FIG. 1; and FIG. 11 is a wiring diagram.

DETAILED DESCRIPTION OF THE PREFERRED EMBODIMENT

A cross-sectionally generally rectangular casing structure, indicated generally at 1, is shown as comprising front and rear walls 2 and 3 repsectively, opposite side walls 4 and 5, a top wall portion 6, and a vertical partition 7 extending transversely from the side wall 4 to the opposite side wall 5. The side walls 4 and 5 cooperate with the rear wall 3 and partition 7 to define a reservoir 8 for dry granular food material, the reservoir 8 having its upper end normally closed by a hinged cover element 9. A second vertically extending partition 10 cooperates with the partition 7 to define a vent passage 11 having its upper end communicating with the exterior of the casing structure 1 through a suitable screened opening 12 in the top wall portion 6. A motor driven blower 13 is suitably mounted on the partition 10 for delivering air from the exterior of the casing structure 1 to the interior of vent passage 11. A tube 13a connects the blower 13 to an opening 14 in the side wall 4, the opening 14 being covered by a screen 15.

The rear wall 3 has a lower portion 16 that slopes forwardly and downwardly and which is connected to the rear end of a generally horizontally disposed body 17 which cooperates with the forwardly sloping rear wall portion 16 to define the bottom of the granular food reservoir 8. The rear portion of the body 17 is formed to provide an upwardly opening circular recess 18, the rear portion of which underlies the reservoir 8, and the front portion of which communicates with a generally vertical passageway 19 that extends upwardly and downwardly from the recess 18, the upper portion of the passageway 19 being aligned with and communicating with the lower end of the vent passage 11, see FIG. 3. A mixing bowl 20 underlies the lower end of the passageway 19 and the front end portion of the body 17, and cooperates with the front end portion of the body 17 to define a mixing chamber 21. The mixing bowl 20 is releasably secured to the body 17 by suitable means, such as a conventional generally U-shaped bail 22.

Means for delivering predetermined charges or batches of dry granular food from the reservoir 8 to the mixing chamber 21 comprises a rotary cylindrical transfer member 23 having a plurality of circumferentially spaced radially outwardly opening notches 24 therein. The transfer member 23 is disposed within the generally cylindrical recess 18, the notches 24 cooperating with the bottom and side walls of the recess 18 to define a plurality of circumferentially spaced food receiving compartments which, when in register with the reservoir 18, become filled with granular food from the reservoir. Rotary movement is imparted to the transfer member 23 by a motor 25 the drive shaft 26 thereof including a cam portion 27, see FIG. 10. Preferably, the notches 24 in the transfer member 23 are three in number, the cam 27 having circumferentially spaced lobes 28 equal in number to the notches 24 in the transfer member 23. The cam lobes 28 are positioned to successively engage the operating arm of a switch 29 that is disposed in a control circuit for the motor 25, to impart intermittent rotary movement to the transfer member 23.

Liquid, such as water, is delivered to the mixing chamber 21 from a supply line 30 to which a valve 31 is attached. A conduit 32 delivers water from the valve 31 to a conventional water heating device 33 mounted within the casing structure 1. A second conduit 34 extends from the heating device 33 to an electrically operated valve 35 mounted on the body 17 above the tank 20, and adapted to admit water to the chamber 21. The valve 35 is conventional in nature, and is operated by a solenoid shown diagrammatically in FIG. 11, and indicated at 36.

For the purpose of preventing bridging of the granular dry food in the reservoir 8, and for aiding in the feeding thereof to the notches of the transfer member 23, an agitator is provided comprising an elongated agitator rod 37 and a plurality of transverse agitator bars or paddles 38 mounted on the rod 37 in longitudinally spaced parallel relationship thereon. The inner end of the rod 37 is provided with a ball-joint connection 39 to a crank 40 extending upwardly from the top surface of the transfer member 23. Thus, as the transfer member 23 rotates, the agitator rod 37 operates as a pitman arm to move the bars or paddles 38 in a direction generally radially with respect to the axis of the transfer member 23. It will be noted that the transfer member 23 is rigidly secured to the upper end of the motor shaft 26 and cam 27 by suitable means such as a machine screw or the like 41. It should be furthur noted, with reference to FIGS. 1–3, that the lower end of the partition 7 is provided with an extension member 42 having a lower edge substantially slidingly engaging the top surface of the rotary transfer member 23, the extension member 42 being formed to provide a recess 43 to provide operating space for the crank 40 and ball-joint connection 39.

A bracket 44 has opposite ends rigidly mounted on the lower end portion of the partition 7 and extension member 42 within the passageway 19. A striker arm 45 is pivotally mounted intermediate its ends to the generally central portion of the bracket 44 by a pin or rivet 46, and has a lower end portion 47 that is adapted to alternately ride upon the top surface of the transfer member 23, and to swing downwardly into engagement with one side of each transfer member notch 24 as the notch moves into registration with the lower portion of the passageway 19. A coil tension spring 48 is connected at its opposite ends to the bracket 44 and upper end of the striker arm 45, to yieldingly urge the lower end portion 47 of the striker arm toward engagement with the transfer member 23. As each notch 24 moves into registration with the lower portion of the passageway 19, the striker arm 45 is rotated by the spring 48 with such force as to cause the impact of the lower end 47 against the side of the underlying notch 24 to dislodge particles of granular food which may adhere to the transfer member 23. As the lower end portion 47 strikes the side of a notch 24, the upper end portion of the arm 45 strikes a transversely forwardly projecting end portion of an L-shaped bracket 45a that is bolted or otherwise secured to the partition 7 and extension member or baffle 42. This action causes the partition 7 and member 42 to vibrate and shake down the granular food in the reservoir 8.

A stirring member or agitator 49 is disposed in the mixing chamber 21 at the lower end of a vertically disposed motor shaft 50 that extends downwardly from a motor 51 mounted on the body 17 in overlying relation to the mixing chamber 21, the shaft 50 extending downwardly through a suitable opening in the body 17. Operation of the agitator motor 51 is controlled by circuit means hereinafter to become apparent.

A feeding nipple 52, preferably made from rubber or similar material, is mounted on a discharge fitting 53 that is screw-threaded through a suitable opening in the lower portion of the mixing tank 20 into a discharge valve body 54 within the mixing chamber 21, see particularly FIG. 5. The valve body 54 is provided with a fluid passage 55 that communicates with the fluid chamber 21 through a valve seat 56 screw-threaded into the valve body 54. A ball-check valve element 57 is normally seated on the valve seat 56 and, when operative, is unseated from the valve seat 56 by a feeding animal sucking on the nipple 52.

A check valve rod 58 is mounted in the discharge valve body 54 for axial movements toward and away from engagement with the ball valve element 57 to releasably hold the ball valve element 57 in engagement with the valve seat 56. A coil compression spring 59 urges the rod 58 upwardly away from engagement with the ball valve element 57. An electric motor 60 is mounted in the casing structure 1 in overlying relationship to the mixing tank 20, the drive shaft 61 of the motor 60 having mounted thereon a crank arm 62 that engages the upper end of the check valve rod 58 to move the same downwardly into closing engagement with the ball valve element 57 against bias of the spring 59. For a purpose which will hereinafter become apparent, the motor 6o is of a special "stall" type which will stall when the rod 58 moves the ball valve element 57 into seating engagement with the seat 56, and which can remain energized for long periods of time in the stalled condition thereof without injury to the motor. As soon as the motor 60 is deenergized, the spring 59 will move the valve rod 58 upwardly causing the motor shaft 61 to rotate in the opposite direction until the crank arm 62 engages a stop member 63 mounted on the casing of the motor 60. In this position of the valve rod 58, the ball valve element 57 is free to be raised from the seat 56.

In addition to its being heated in the water heating device 33, water delivered to the mixing chamber 21 is maintained at proper feeding temperature by a conventional emergent-type heater 64 controlled by thermostat 65. These are shown in the diagram of FIG. 11, and may be assumed to be disposed in the mixing chamber in the manner shown in the above-mentioned U.S. patents. Also shown in FIG. 11 are a pair of cooperating thermostat elements 66 which control the temperature of the water within the heating tank 33.

The blower 13, dry food dispenser motor 25, water heating device 33, solenoid 36, motor 51, discharge valve motor 60, heater 64 and thermostat 65 and 66 are disposed in circuit arrangements including a master switch 67 that is connected to a powerline, not shown, by means of a grounded plug 68 of conventional construction. When the switch 67 is closed and the valve 31 opened, water is fed through the heater 33 to the mixing chamber 21, and the dispenser motor 25 is energized to rotate the transfer member 23 one-third of a revolution to dispense a given charge of dry granular food to the mixing chamber 21 through the lower portion of the passageway 19. The heating element 64 and agitator motor 51 are energized to maintain the water in the mixing chamber 21 at predetermined temperature and mix the dry food and water in the chamber 21. At the same time, the blower 13 is energized to ventilate the mixing chamber 21. It should be noted that the discharge valve motor 60 is energized to hold the discharge valve closed until the food and water are thoroughly mixed, and for a predetermined time thereafter. The cycling of the various electrical components is governed by control circuitry, and the time interval between the completion of mixing of food and water in the mixing chamber 21 and deenergization of the motor 60 to render the liquid food available at the nipple 52, is also goverened by control circuitry and components now to be described.

The master switch 67 is connected to the plug 68 by a pair of leads 69, one of which is fused, as indicated at 70. A pair of leads 71 and 72 lead from the master switch 67 to a pair of junction blocks 73 and 74 respectively. The primary coil of a transformer 75 is connected across the leads 71 and 72, the secondary coil of the transformer 75 being connected to ground through a lead 76. A relay coil 77 is interposed in the lead 76, and controls operation of a pair of switches 78 and 79. The switch 79 is a holding switch to maintain a circuit through the relay coil by means of a lead 80 extending from the switch 79 to the opposite end of the secondary coil of the transfromer 75. Like the transformer 75, the water heaters 33 and 64, with their respective thermostats 66 and 65, and blower 13, are energized at all times when the master switch 67 is closed. The heater 33 and its thermostats 66 are interposed in series in a lead 81 that is connected at one end to the lead 71, and at its other end to the junction block 74. The heater 64 and its thermostat 65 are interposed in series in a lead 82 that is connected at its opposite ends to the junction blocks 73 and 74. Likewise, the blower 13 has its motor connected in a lead 83 connected at its opposite ends to the junction blocks 73 and 74.

A pair of high and low liquid level control elements 84 and 85 respectively are shown in the diagram of FIG. 11 and may be assumed to be positioned within the mixing chamber 21 in the manner disclosed in the above-identified U.S. patents. The element 84 is connected to the lead 80 by a lead 86, the element 85 being connected to the lead 80 through the switch 79 by a lead 87.

A timer control cooperates with the liquid level control elements 84 and 85 to initate filling of the mixing chamber 21 with water and dry food, and thoroughly mix the same, and involves a plurality of timer switches 88, 89, 90 and 91, a timing motor 92, and a plurality of cams 93, 94, 95 and 96, the cams 93–96 being driven at relatively low speed by the motor 92. The agitator motor 51 is controlled in part by an agitator timer motor 97 which operates an agitator timer switch 98 through the medium of a suitable cam 97a and the timer switch 88.

A time delay mechanism controlling operation of the discharge valve operating motor 60 includes a pair of time delay switches 99 and 100, a motor 101 having a drive shaft 102, and a pair of cams 103 and 104 mounted on the drive shaft 102 for operating the switches 99 and 100. Means operatively connected to the switches 99 and 100 for varying the time interval between the completion of the filling and mixing cycle and operation of the motor 60 to render mixed switch 105 food available at the nipple 52, comprises a three-position switfce105 having a manually operable switch arm 106. In FIG. 1, the switch 105 is shown as having an operating knob 107 which may be assumed to be coupled to the switch arm 106. The switch 105 is preferably mounted on the top wall portion 6, the motor 92 and its related switches 88–91, and motor 101 and its related switches 99 and 100 being supported from the top wall portion 6 by mounting plates 108 and 108a and nut-equipped screws 108b. Further, as shown in FIGS. 1 and 9, the agitator timer motor 97 and switch 98 are supported on a bracket 97b secured to the side wall 5 of the casing structure 1.

A pair of leads 71a and 72a are connected to the leads 71 and 72 respectively at their connection with the master switch 67, the lead 71a extending therefrom to one of the terminals of switch 90, and from thence to a given terminal of each of the switches 99 and 100. The lead 72a is connected intermediate its ends to a terminal of each of the switches 88 and 89, extending to one of the terminals of switch 91. The cycle timing motor 92 is interposed in the lead 72a between the switches 89 and 91. The valve operating solenoid 36 is interposed in a lead 109 that extends from a terminal of the switch 89 to a terminal of the switch 90, the lead 109 being connected intermediate the switch 90 and solenoid 36 to a terminal of the relay operated switch 78. The dry food dispenser motor 25 is interposed in a lead 110 that extends from a terminal of the cam operated switch 29 to the junction block 74, a second terminal of switch 29 being connected to the lead 109 by a lead 111. A second terminal of the switch 29 is connected to a terminal of the timing switch 91 by a lead 112 that is connected intermediate its ends to a terminal of relay switch 78. The liquid food agitator motor 51 is interposed in a lead 113 that extends from the junction block 73 to a terminal on the switch 88, a terminal of the agitator timer switch 98 being connected to the lead 113 intermediate the motor 51 and switch 88. A second terminal on the switch 98 is connected in series with the agitator timer motor in a lead 114 that extends from the junction block 73 to a terminal on the cycle timing switch 88. The discharge valve motor 60 is interposed in a lead 115 that extends from the junction block 74 to the switch arm 106 of the time delay selector switch 105, and from thence through the time delay motor 101 to a terminal on the cycle timing switch 89. Of the selective terminals of switch 105, one thereof is connected to the switch 99 by a lead 116, a second to a terminal in the switch 100 by a lead 117, and a third being connected to a lead 118 that extends from a terminal on switch 91, through a terminal on switch 90, through said third terminal on switch 105, a terminal on switch 99 and to a terminal on switch 100. The circuitry is completed by a lead 119 connecting lead 71 to a terminal on the relay operated switch 78.

DESCRIPTION OF THE OPERATION AND TIMING

The beginning of an operational cycle, switches

88–91 are in their normally closed positions shown in FIG. 11, as are switches 99 and 100. Assuming that the valve 31 is open, the plug 68 connected to a source of electrical energy, and that the mixing chamber 21 is empty, closing of the switch 67 energizes the cycle timer motor 92 and delay timer motor 101 through respective switches 89 and 91 in their NC positions. The heaters 33 and 64 are energized, as is the blower motor 13, the agitator timer motor 97 being energized switch 88 in its NC position. The dry food dispenser motor 25 is energized through switch 90 in its NC position and switch 29, and the discharge valve motor 60 is energized through switch 89 in its NC position. As the cycle timer motor 92 operates, the switch 88 is moved to its NO position to keeps the circuit closed to the agitator motor 51; the switch 90 is moved to its NO position to keep the timer motor 90 operating and a circuit closed to the valve motor 60 from lead 109 to lead 72a. The switch 89 is shifted to its NO position to close the circuit to the solenoid valve 36 to feed water to the bowl and to deenergize the delay timer motor 101. The switch 91, is then shifted to its NO position to denergize the timer motor 92. The timing motors 92 and 101 will remain deenergized during filling of the mixing bowl with water.

When liquid in the mixing bowl reaches the level of the electrode 84, the relay 77 is energized to close switch 79 and move switch 78 to the left thus deenergizing the liquid valve solenoid 36, the switch 79 establishing a holding circuit for the relay coil 77 until the level of liquid in the mixing bowl subsequently drops to a level lower than that of the electrode 85. Energization of the relay coil 77 and above-mentioned movement of the switch 78 causes re-energization of the timing motor 92. In the event that switch 29 has not already been opened, the dispenser motor will run until the switch 29 is opened by movement of the cam 27.

The cycle timing motor 92 operates to dispose the switch 88 in its NC position to break the direct circuit to the agitator motor 51, and completes the circuit through the agitator timer motor 97. The agitator timer motor 97 will operate its switch 98 to cause intermittent operation of the agitator motor 51. Further, operation of the timing motor 92 causes the switch 90 to shift to its NC position to break the circuit to the check-valve motor 60 allowing an animal to feed, depending upon the condition of the delay timer switches 99, 100 and 105. The timing switch 89 is shifted to open the circuit therethrough to the liquid inlet solenoid, and closes circuit through the switch 105 and a selected one of the switches 99 and 100 to give a predetermined timed delay before deenergizing the valve motor 60 to permit the animal to feed. The switch 89, in this disposition, also conditions the circuit to energize the delay timer motor 101 at the beginning of a new cycle. Further, the cycle timer motor 92 shifts the switch 91 to its NC position, whereupon the motor 92 becomes deenergized, but ready for reenergization after the mixing bowl has been emptied and the relay coil 77 energized.

It will be noted, that under control of the agitator timer motor 97, the agitator motor 51 is energized for a short duration during each revolution of the cam 97a to keep the solution in the mixing chamber stirred while the animal is not nursing or when the unit is in a prolonged delay period.

As above stated, at the end of the operational cycle, the switch 89 closes to energize the delay timer motor 101. The delay timer motor 101 and check-valve motor 60 will remain energized until the delay cams 103 and 104 actuate their respective switches 99 and 100 to deenergize the delay timer motor and check-valve motor. In the embodiment illustrated, the delay timer motor 101 turns its cams 103 and 104 one revolution every four mintures. The switch 99 is operated twice every revolution, adding approximately 2 minutes to the operational cycle. Switch 100 is operated once every revolution of its cam, adding approximately 4 minutes to the operational cycle. It will be appreciated that the speeds of the motors 92 and 101 may be varied to suit given operational requirements as desired.

As above indicated, a subsequent cycle of filling and mixing will not be initiated until a suckling animal consumes enough of the liquid food to bring the level thereof below the low liquid level element 85. When this occurs, the circuit through the relay coil 77 is broken, causing the relay switch 78 to return to its position connecting the lead 119 to the lead 109 to initiate a subsequent cycle of operation and reenergize the valve operating motor 60 to lock the ball check valve element 57 in its closed position.

By providing for a selective time delay between cycles of operation, feeding schedules can be arranged for animals of different ages or having different feeding habits, as well as enabling one to establish predetermined feeding habits for suckling animals.

While a commercial embodiment of the improved animal food mixer and feeder has been shown and described, it will be understood that the same is capable of modification without departure from the spirit and scope of the invention, as defined in the claims.

What is claimed is:

1. In a liquid food mixer and animal feeder; structure defining a reservoir for dry granular food and a mixing chamber having an outlet in its bottom portion; a feeding nipple secured to said outlet; mechanism for dispensing dry food to the mixing chamber and including a rotary dry food transfer disk defining a plurality of circumferentially spaced transfer chambers moving successively between registration with said reservoir and said mixing chamber for delivering predetermined quantities of dry food to the mixing chamber, and a drive motor for imparting rotation to said disk; means for delivering liquid to said mixing chamber; a discharge valve controlling discharge of material through said outlet; operating mechanism for said valve; control circuit means including, time delay mechanism for controlling the valve operating mechanism subsequent to delivery of dry food and liquid to the mixing chamber, and means for varying the time delay produced by the time delay mechanism; said control means further including a switch operated by the drive motor for the dry food transfer disk for intermittently energizing and deenergizing said drive motor independently of the time delay mechanism; a dry food agitator disposed in said dry food reservoir in generally overlying relation to said transfer disk for reciprocatory movement transversely of the reservoir; and a crank element mounted on said transfer disk for rotation therewith; said agitator including a pitman arm having one end pivotally connected to said crank element, and rake elements spaced apart longitudinally of the pitman arm and extending transversely thereof.

2. The liquid food mixer and animal feeder defined in claim 1 in which said structure includes a bottom wall for said dry food reservoir extending generally transversely of said transfer member, at least one of said rake elements slidably engaging said bottom wall to support said agitator outwardly of said pivotal connection thereof with said crank element.

* * * * *